May 16, 1961 L. J. SEMON 2,984,707

MONITOR CONTROL UNIT AND SYSTEM FOR SWITCHBOARD

Filed Jan. 24, 1958

INVENTOR.
LAWRENCE J. SEMON
BY Saul B. Minero
ATTORNEY.

United States Patent Office 2,984,707

Patented May 16, 1961

2,984,707

MONITOR CONTROL UNIT AND SYSTEM FOR SWITCHBOARD

Lawrence J. Semon, 918 Ocean Front, Santa Monica, Calif.

Filed Jan. 24, 1958, Ser. No. 711,033

2 Claims. (Cl. 179—42)

Figures 1, 2:
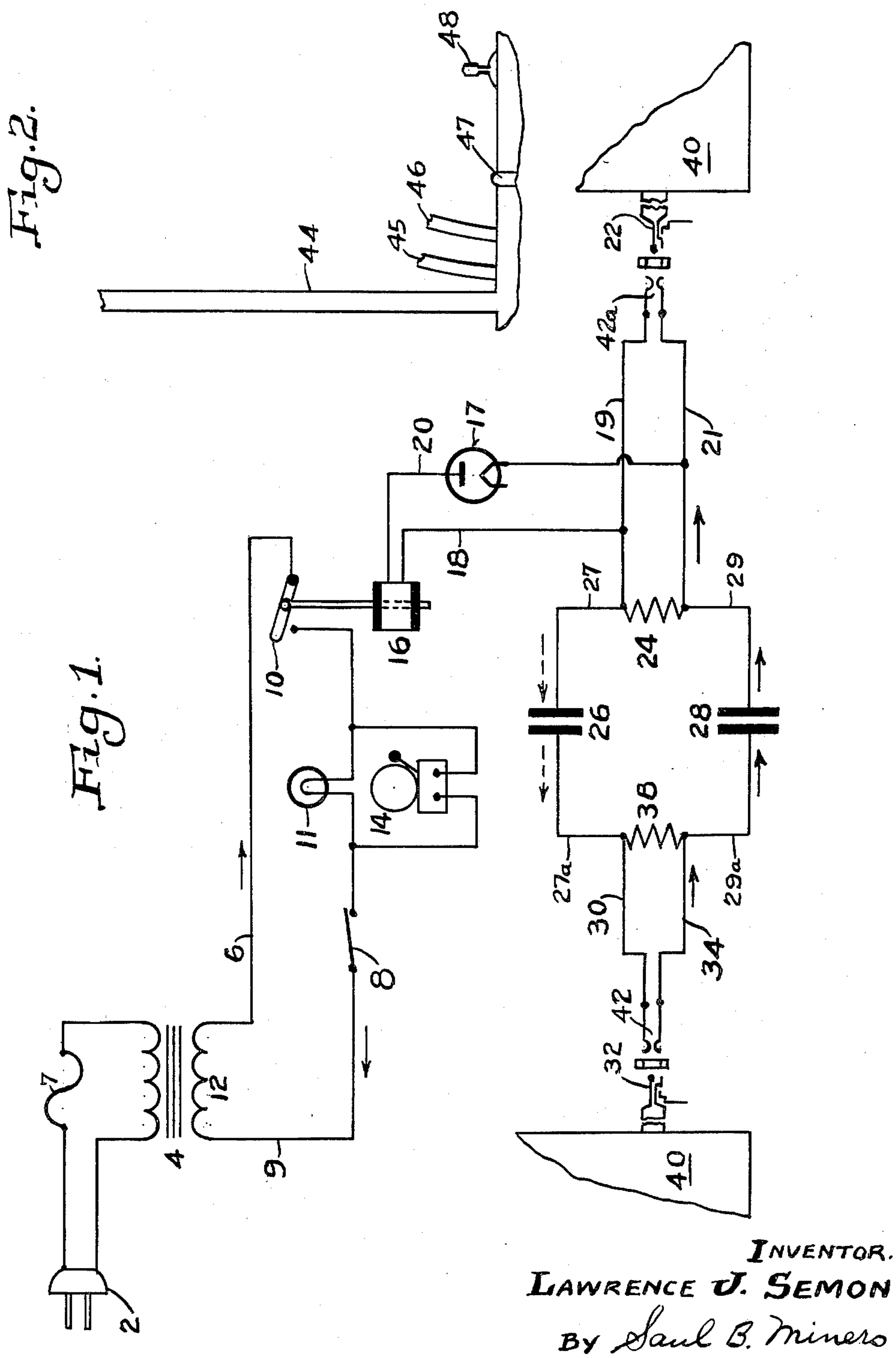

This invention relates to improvements in telephone answering systems and in a monitor supervising unit and more specifically to an auxiliary monitoring system and unit used in conjunction with said telephone answering systems.

The monitor control unit is for use by a private owner and his operators engaged in the answering and secretarial service business and other businesses using switchboard operating systems. Clients' telephone lines are connected to the answering service switchboards. The services include the answering of clients' telephone calls in clients' absence and in connecting such calls with the clients at some other numbers where the clients may be reached.

The primary object of the invention is the provision of automatic supervision of telephone calls and the maintenance of good transmission of sound on "bridged" or sometimes called "patched" telephone calls.

The automatic supervision is both visual and audible and eliminates the necessity of periodic monitoring of calls by the operator of the service switchboards.

Another object of my invention is that good transmission of sound is maintained by isolating the two circuits, that is, the telephone company circuit from the service switchboard circuit, in a manner which maintains the same level of transmission experienced on the incoming call. All such "bridged" calls are loud and clearly understandable.

This unit comprises three separate circuits and is used primarily to intercept and connect an incoming call on a P.B.X receiving cabinet in the office of the company using one or more P.B.X receiving cabinets, to the party being called when said party is at another location.

As an example: If a doctor's patient calls him at his office number after office hours, the operator at the service office intercepts that call and holds the caller on the line. She then dials out to reach the doctor at home and puts him through directly to his patient with a minimum loss of time.

When the doctor hangs up, a red light appears on the monitor unit and the buzzer sounds, which is a signal to the operator that the call is completed. This permits the operator to release the lines immediately to be re-used at once.

Without automatic supervision, the lines are tied up unnecessarily causing costly delays and inconveniences to the users of telephone facilities. This monitor unit also eliminates errors due to emotionally excited people, who, in an emergency are prone to give wrong numbers which would be useless to the doctor and prevent him from reaching them to give medical instruction for the patient.

This service is also applicable to all professions and businesses using P.B.X receiving cabinets. Single or multiple monitor units may be used.

An important object of this invention is to eliminate the drop or fading of voice sounds in the line by maintaining the same level of voice sounds on all "bridged" calls as experienced by the operator on the incoming call.

My invention also comprises novel methods, combinations and arrangements of elements which will more fully appear in the following specification and will be pointed out with particularity in the appended claims.

The wiring diagram, which is Fig. 1, merely shows one example of how my invention may be carried out.

Fig. 2 is a fragmentary diagrammatic view of a conventional P.B.X switchboard used by an answering service.

The numeral 2 designates an electrical plug to be connected to the source of current. In this case 110 volts of alternating current is used, the same being reduced to 6 volts by a conventional step-down transformer, 4, having a fuse 7 on the primary side, the secondary current flows through wire 6, a relay controlled switch 10, and incandescent signal lamp 11, through switch 8, and back to the secondary winding 12, through wire 9.

A signal buzzer 14 is connected in series to wire 9. Relay 16 is connected by wires 18 and 20, to wires 19 and 21, said wires having monitor jack 42*a* which is connected to condensers 26 and 28 through wires 27 and 29 with resistor 24 across the lines 19 and 21. A diode tube 17 is connected to wire 20.

The other side of condenser 26 is connected by means of wire 27*a* to wire 30 which terminates in monitor jack 42. The other side of condenser 28 is connected to wire 34 by means of wire 29*a* which terminates in monitor jack 42 with resistor 38 across the wires 30 and 34.

Plugs 22 and 32 are connected to jacks 42*a* and 42 of the monitor unit in a conventional manner.

In Fig. 2, numeral 44 designates a receiving switchboard, answering front cord plug 45, calling cord plug 46, signal lamp 47 and lever type key switch 48.

The switchboard operation of the manual central office of the telephone company is briefly as follows:

When a call comes in on this switchboard the light by the calling party's jack lights up. The operator sees the light and inserts the plug of the answering cord into said jack. The plug of the calling end of the cord is plugged into the jack of the called telephone. Next a ringing current is sent down the line to notify the called party. When called party answers, operator gets a signal. When call is completed, both receivers are replaced and operator gets a signal to remove plugs. The current used by the telephone company is from its power plant of batteries and is direct current.

The switchboard operation of the answering service without the monitor unit, with respect to "bridged" calls, is briefly as follows:

A call comes in and answering plug goes into proper jack and the incoming call is held pending making of outside call to client by answering service. When client answers, the answering service operator places the back plug associated with outgoing call into the jack on which she is holding incoming call, whereby connection is then made for both parties to converse together.

When conversation is completed there are no facilities to notify the answering service operator that the plugs can be removed and that the lines are available for re-use except by the operator opening the key in the answering switchboard to listen in. The current used by the answering service is from its plant of storage batteries and is direct current.

The switchboard operation of the answering service with the monitor control unit uses the system shown in the wiring diagram. The operator sees the lighted lamp on her switchboard and inserts the front cord plug 45 into jack associated with lighted lamp. Then the operator makes an outgoing call through the front cord plug 46 into jack to notify client of pending held call. The operator plugs into the monitor unit the back cord plug 32 into jack 42 of the incoming call and the back cord of plug 22 in jack 42*a* of the outgoing call.

It will be seen that there are two cord plugs, front and back for each line. The two front cord plugs are plugged into the incoming and outgoing call on the switchboard of the answering service and the two back cord plugs of said lines are plugged into the jacks of the monitor unit.

When the parties hang up, the current which goes through diode tube 17, relay 16, is energized and switch 10 closes, thus energizing the light 11 and buzzer 14, which remain activated until de-activated by the operator in the usual manner. The two back cord plugs and the two trunk lines (front cord plugs) are then ready for re-use. The polarity reverses when the party on the outgoing line hangs up.

The capacitor or condenser prevents the mixing of the direct current of the two calls while allowing the alternating current, which is vital, since the alternating current carries the sound impulses, to pass.

On "bridged" calls under the present old system, the alternating current and direct current are mixed, resulting in fading or drop in volume of voice sounds or impulses.

On local calls, the polarity reverses instantly when parties hang up, which activates the relay controlling the buzzer and light in the monitor control unit.

On direct distance dial calls because of booster equipment necessary on part of the telephone company to provide good transmission, it requires approximately 20 seconds after the call to party hangs up for the activation of the relay which controls the audible and visual supervision in the telephone company's office.

At no time is there any injection of electric current into the telephone equipment of the telephone company's system and no interference with its normal operation.

The monitor control unit prevents loss of transmission by isolating the incoming and outgoing calls on the switchboard of the answering service.

A "bridged" or "patched" call is a call wherein connection is made and completed between two outside parties through a switchboard.

At present on "patched" or "bridged" calls without this monitor unit, there is no audible or visual supervision on any answering service line jack nor trunk line that will give evidence that the call has been terminated.

Often on "bridged" calls the lines may be extended to adjoining switchboards on either side of the operator. Under pressure an operator may pull the wrong cords terminating unfinished conversations. With this monitor control unit the "bridged" call is at eye level with the operator and the two back cord plugs are inserted into jacks in the monitor unit adjacent to one another, directly in front of the operator.

From the foregoing it is apparent that I have invented a telephone monitor unit for use with regular switchboards to automatically maintain the transmission and supervise the termination of "bridged" calls. My invention also eliminates the necessity for observing whether calls are terminated, by the automatic actuation of a signal light and buzzer, which give visual and sound supervision of the same.

While I have illustrated and described one example of carrying out my invention, I hereby reserve the right to make numerous changes within the scope of the appended claims.

I claim:

1. A monitor supervising unit for connecting an incoming call received at a telephone answering switchboard to an independent outgoing call originated at said switchboard and directed to an outside station, said unit comprising, in combination: first plug receiving connecting means for connection to said incoming call at said switchboard; second plug receiving connecting means for connection to said outgoing call; voice transmission lines connected between said first and second plug receiving connecting means; a control circuit including a relay coil and rectifier connected in series with each other, said control circuit being connected across said transmission lines whereby said relay coil is energized in response to a change in voltage across said lines as a consequence of the termination of one of said calls; a signal means; a source of current; and a switch operable by said relay coil in response to energization of said relay coil for connecting said source of current to said signal means to indicate a change in said voltage whereby an operator at said switchboard is apprised of the completion of voice transmission between said calls.

2. The subject matter of claim 1, in which said voice transmission lines include direct current blocking condensers.

References Cited in the file of this patent

UNITED STATES PATENTS

| | | |
|---|---|---|
| 1,603,290 | O'Neill | Oct. 19, 1926 |
| 1,713,564 | Stazak | May 21, 1929 |
| 2,180,963 | Pearce | Nov. 21, 1939 |
| 2,278,702 | Knittle | Apr. 7, 1942 |
| 2,572,104 | Bowne | Oct. 23, 1951 |
| 2,863,950 | Dunning | Dec. 9, 1958 |